(12) United States Patent
Iwasaki

(10) Patent No.: US 10,136,072 B2
(45) Date of Patent: Nov. 20, 2018

(54) IMAGE PICKUP APPARATUS, IMAGE PICKUP SYSTEM, METHOD FOR CONTROLLING IMAGE PICKUP APPARATUS, METHOD FOR CONTROLLING IMAGE PICKUP SYSTEM, AND PROGRAM

(71) Applicant: CANON KABUSHIKI KAISHA, Tokyo (JP)

(72) Inventor: Takahiro Iwasaki, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 15/031,893

(22) PCT Filed: Oct. 21, 2014

(86) PCT No.: PCT/JP2014/005338
§ 371 (c)(1),
(2) Date: Apr. 25, 2016

(87) PCT Pub. No.: WO2015/064058
PCT Pub. Date: May 7, 2015

(65) Prior Publication Data
US 2016/0269612 A1  Sep. 15, 2016

(30) Foreign Application Priority Data

Oct. 28, 2013  (JP) ................................. 2013-223524

(51) Int. Cl.
*H04N 5/225* (2006.01)
*H04N 5/232* (2006.01)
(Continued)

(52) U.S. Cl.
CPC .......... *H04N 5/2355* (2013.01); *G03B 7/091* (2013.01); *G06T 7/215* (2017.01);
(Continued)

(58) Field of Classification Search
CPC ............... H04N 5/2355; H04N 5/2353; H04N 5/23206; H04N 1/00204; G08B 13/19656; G08B 13/1966; G06T 7/215; G03B 7/091
See application file for complete search history.

(56) References Cited

U.S. PATENT DOCUMENTS

2004/0263628 A1* 12/2004 Amburu .............. H04N 5/23206
348/207.1
2005/0162525 A1* 7/2005 Koshikawa ........ H04N 5/23203
348/211.99
(Continued)

FOREIGN PATENT DOCUMENTS

CN 101203884 A 6/2008
CN 101272458 A 9/2008
(Continued)

*Primary Examiner* — Chia-Wei A Chen
*Assistant Examiner* — John H Morehead, III
(74) *Attorney, Agent, or Firm* — Canon USA, Inc., IP Division

(57) ABSTRACT

An image pickup apparatus capable of communicating with an external apparatus via a network includes an image pickup unit, a receiving unit, a control unit, and a transmitting unit. The receiving unit receives, from the external apparatus via the network, a synthesizing command for controlling an operation to synthesize a plurality of images captured by the image pickup unit under different exposure conditions and an exposure setting command for controlling an operation to obtain an image generated under a preset exposure condition. The control unit selectively controls the operations requested by the synthesizing command and the exposure setting command if the synthesizing command and the exposure setting command are received by the receiving unit. The transmitting unit transmits, to the external apparatus via the network, a non-error response to at least one of the received synthesizing command and the received exposure setting command that requests an operation not selectively controlled.

13 Claims, 13 Drawing Sheets

(51) Int. Cl.
*H04N 5/235* (2006.01)
*G03B 7/091* (2006.01)
*G08B 13/196* (2006.01)
*H04N 1/00* (2006.01)
*G06T 7/215* (2017.01)

(52) U.S. Cl.
CPC ... *G08B 13/1966* (2013.01); *G08B 13/19656* (2013.01); *H04N 1/00204* (2013.01); *H04N 5/2353* (2013.01); *H04N 5/23206* (2013.01)

(56) References Cited

U.S. PATENT DOCUMENTS

| | | | | |
|---|---|---|---|---|
| 2007/0104476 | A1* | 5/2007 | Yasutomi | H04N 1/0044 396/287 |
| 2009/0034951 | A1* | 2/2009 | Kawasaki | G03B 17/00 396/57 |
| 2010/0118162 | A1* | 5/2010 | Saijo | H04N 5/23203 348/231.6 |
| 2013/0120606 | A1 | 5/2013 | Iwasaki | |
| 2013/0286249 | A1* | 10/2013 | Yost | H04N 5/232 348/231.99 |
| 2013/0332706 | A1* | 12/2013 | Tanaka | G06F 13/385 712/220 |

FOREIGN PATENT DOCUMENTS

| | | |
|---|---|---|
| CN | 101816171 A | 8/2010 |
| JP | 2003-299067 A | 10/2003 |
| JP | 2006-279233 A | 10/2006 |
| JP | 2007-49313 A | 2/2007 |
| JP | 2008-236142 A | 10/2008 |
| JP | 2013-162190 A | 8/2013 |

* cited by examiner

FIG. 6A

```xml
<xs:complexType name="ImagingSettings20">
  <xs:sequence>
    <xs:element name="BacklightCompensation" type="tt:BacklightCompensation20" minOccurs="0"/>
    <xs:element name="Brightness" type="xs:float" minOccurs="0"/>
    <xs:element name="ColorSaturation" type="xs:float" minOccurs="0"/>
    <xs:element name="Contrast" type="xs:float" minOccurs="0"/>
    <xs:element name="Exposure" type="tt:Exposure20" minOccurs="0"/>
    <xs:element name="Focus" type="tt:FocusConfiguration20" minOccurs="0"/>
    <xs:element name="IrCutFilter" type="tt:IrCutFilterMode" minOccurs="0"/>
    <xs:element name="Sharpness" type="xs:float" minOccurs="0"/>
    <xs:element name="WideDynamicRange" type="tt:WideDynamicRange20" minOccurs="0"/>
    <xs:element name="WhiteBalance" type="tt:WhiteBalance20" minOccurs="0"/>
    <xs:element name="Extension" type="tt:ImagingSettingsExtension20" minOccurs="0"/>
  </xs:sequence>
  <xs:anyAttribute processContents="lax"/>
</xs:complexType>
```

FIG. 6B

```
<xs:complexType name="ImagingSettingsExtension20">
  <xs:sequence>
    <xs:any namespace="##other" processContents="lax" minOccurs="0" maxOccurs="unbounded"/>
    <xs:element name="ImageStabilization" type="tt:ImageStabilization" minOccurs="0"/>
    <xs:element name="Extension" type="tt:ImagingSettingsExtension202" minOccurs="0"/>
  </xs:sequence>
</xs:complexType>
```

FIG. 6C

```
<xs:complexType name="ImagingSettingsExtension202">
    <xs:sequence>
        <xs:element name="IrCutFilterAutoAdjustment" type="tt:IrCutFilterAutoAdjustment" minOccurs="0" maxOccurs="unbounded"/>
        <xs:element name="Extension" type="tt:ImagingSettingsExtension203" minOccurs="0"/>
    </xs:sequence>
</xs:complexType>
```

FIG. 6D

```
<xs:complexType name="ImagingSettingsExtension203">
  <xs:sequence>
    <xs:element name="DarkCompensation" type="tt:DarkCompensation" minOccurs="0" maxOccurs="unbounded"/>
    <xs:element name="Extension" type="tt:ImagingSettingsExtension204" minOccurs="0"/>
  </xs:sequence>
</xs:complexType>
```

FIG. 6E

```
<xs:complexType name="ImagingSettingsExtension20_4">
  <xs:sequence>
    <xs:any namespace="##targetNamespace" processContents="lax" minOccurs="0" maxOccurs="unbounded"/>
  </xs:sequence>
</xs:complexType>
```

IMAGE PICKUP APPARATUS, IMAGE PICKUP SYSTEM, METHOD FOR CONTROLLING IMAGE PICKUP APPARATUS, METHOD FOR CONTROLLING IMAGE PICKUP SYSTEM, AND PROGRAM

TECHNICAL FIELD

The present invention relates to an image pickup apparatus, an image pickup system, a method for controlling an image pickup apparatus, a method for controlling an image pickup system, and a program and, in particular, to a synthesizing technology for generating composite image data by synthesizing a plurality of image data items generated by capturing the image of a subject using an image pickup unit under a plurality of exposure conditions.

BACKGROUND ART

A technology for capturing an image without generating overexposure and under-exposure has been developed.

For example, a wide dynamic range process to increase the dynamic range of a composite image by synthesizing a plurality of images has been developed. PTL 1 describes an image pickup apparatus that generates an image having an increased dynamic range by synthesizing a plurality of images captured using different exposure time settings.

In addition, as an example of the above-described techniques, a technique called "dodging" has been used for silver halide photography in a dark room to generate a photo having a wick dynamic range. To apply a similar technique to a digital photo, a technique for correcting the image of a subject having a high contrast (in particular, an image of a subject captured against the sun) has been developed. This technique is called "digital dodging". To control the effect of digital dodging, the gain, for example, of the image is changed.

Furthermore, with the widespread use of a network technology, there has been a growing user need to control an image pickup apparatus from an external apparatus via a network.

Accordingly, the present invention provides a technology for appropriately controlling a synthesizing unit and an exposure setting unit in accordance with reception of a synthesizing command and an exposure setting command and preventing a user from misunderstanding the response to each of the commands.

CITATION LIST

Patent Literature

PTL 1: Japanese Patent Laid-Open No. 2008-236142

SUMMARY OF INVENTION

Solution to Problem

According to the present invention, an image pickup apparatus capable of communicating with an external apparatus via a network is provided. The image pickup apparatus includes an image pickup unit, a receiving unit configured to receive, from the external apparatus via the network, a synthesizing command for controlling an operation to synthesize a plurality of images captured by the image pickup unit under different exposure conditions and a exposure setting command for controlling an operation to obtain an image generated under a preset exposure condition, a control unit configured to selectively control the operations requested by the synthesizing command and the exposure setting command if the synthesizing command and the exposure setting command are received by the receiving unit, and a transmitting unit configured to transmit, to the external apparatus via the network, a non-error response to at least one of the received synthesizing command and the received exposure setting command that requests the operation not selectively controlled.

Further features of the present invention will become apparent from the following description of embodiments with reference to the attached drawings.

BRIEF DESCRIPTION OF DRAWINGS

FIG. 6A illustrates an example of definition of an ImagingSettings type according to the first embodiment of the present invention.

FIG. 6B illustrates an example of definition of an ImagingSettings type according to the first embodiment of the present invention.

FIG. 6C illustrates an example of definition of an ImagingSettings type according to the first embodiment of the present invention.

FIG. 6D illustrates an example of definition of an ImagingSettings type according to the first embodiment of the present invention.

FIG. 6E illustrates an example of definition of an ImagingSettings type according to the first embodiment of the present invention.

DESCRIPTION OF EMBODIMENTS

Exemplary embodiments of the present invention are described in detail below with reference to the accompanying drawings.

Note that the configurations described in the following embodiments are only examples. The configurations of the present invention are not limited to the illustrated configurations. In addition, a command and a coordinate system in the following embodiments are defined on the basis of a standard such as Open Network Video Interface Forum (hereinafter also simply referred to as "ONVIF").

First Embodiment

Figure 1:
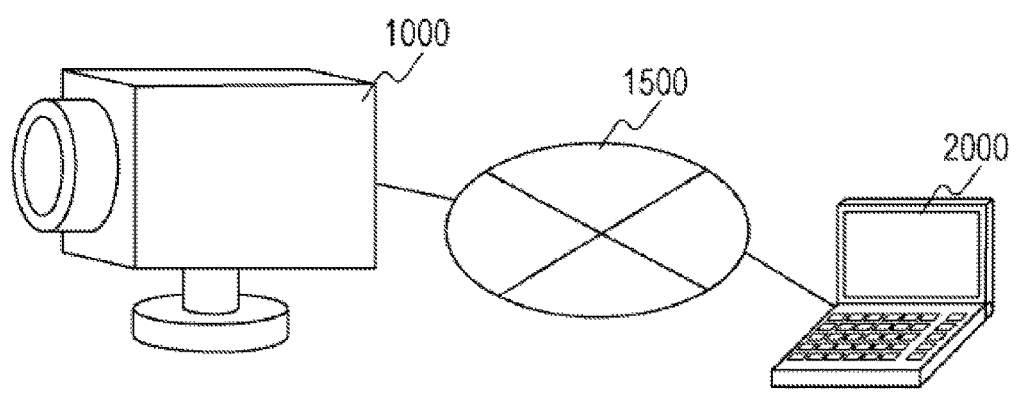
FIG. 1 illustrates an example of the system configuration of a security monitoring system according to a first embodiment of the present invention.

A network configuration according to the present embodiment is described below with reference to FIG. 1. More specifically, FIG. 1 illustrates an example of the system configuration of a security monitoring system according to the present embodiment.

In the security monitoring system according to the present embodiment, a security camera 1000 that captures a moving image is connected to a client device 2000 over an IP network 1500 (via a network) so as to communicate data with each other. In this manner, the security camera 1000 can distribute image data to the client device 2000 via the IP network 1500.

Note that according to the present embodiment, the client device 2000 is an example of an external apparatus, such as a PC. In addition, the security monitoring system according to the present embodiment corresponds to an image pickup system.

The IP network 1500 is formed from, for example, a plurality of routers, switches, and cables that meet the communication standard, such as Ethernet (registered trade name). Note that according to the present embodiment, any communication standard, any scale of a network, and any configuration that allow communication between the security camera 1000 and the client device 2000 can be employed.

For example, the IP network 1500 may be formed from the Internet, a wired local area network (LAN), a wireless LAN, or a wide area network (WAN). Note that according to the present embodiment, the security camera 1000 may support, for example, Power Over Ethernet (POE, registered trade name). Thus, the security camera 1000 may receive electric power via a LAN cable.

The client device 2000 transmits a variety of commands to the security camera 1000. Examples of the command include a command to change the imaging direction and the angle of view of the security camera 1000, a command to change an imaging parameter, and a command to start image streaming.

In contrast, the security camera 1000 transmits a response to the command and image streaming to the client device 2000. In addition, upon receiving, from the client device 2000, a command to change the angle of view, the security camera 1000 changes the angle of view.

Figure 2:
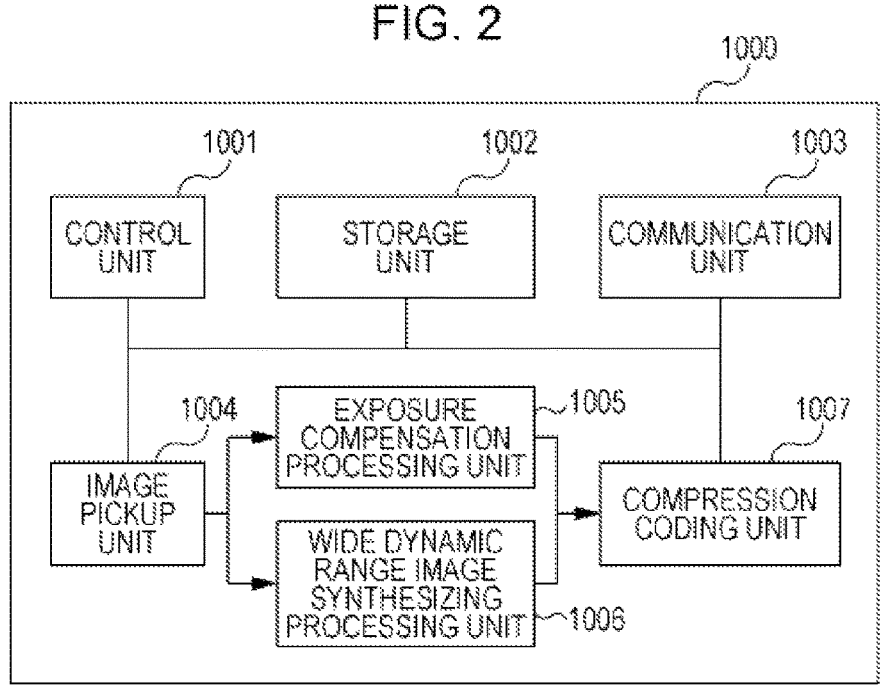
FIG. 2 illustrates an example of the hardware configuration of a security camera according to the first embodiment of the present invention.

FIG. 2 illustrates an example of the hardware configuration of the security camera 1000 according to the present embodiment.

As illustrated in FIG. 2, a control unit 1001 performs overall control of the components of the security camera 1000. In addition, the control unit 1001 is formed from a center processing unit (CPU). The control unit 1001 executes a program stored in a storage unit 1002. Alternatively, the control unit 1001 may perform control using the hardware.

The storage unit 1002 is used as a storage area for a variety of data. For example, the storage unit 1002 is used as a program storage area that stores a program to be executed by the control unit 1001, a work area used during execution of the program, and a storage area that stores image data generated by an image pickup unit 1004 (described in more detail below). A communication unit 1003 receives a variety of control commands from the client device 2000. In addition, the communication unit 1003 transmits a variety of control commands to the client device 2000.

The image pickup unit 1004 is formed from an imaging optical system (not illustrated) and an imaging device, such as a CCD or a CMOS. The image pickup unit 1004 captures the image of a subject formed by the imaging optical system and generates an analog signal. In addition, the image pickup unit 1004 converts the generated analog signal into digital data. That is, the image pickup unit 1004 converts the analog signal generated by capturing the image of the subject into digital data.

Furthermore, the image pickup unit 1004 outputs, as image data, the converted digital data to the storage unit 1002, an exposure compensation processing unit 1005, and a wide dynamic range image synthesizing processing unit 1006.

The exposure compensation processing unit 1005 analyzes the image data output from the image pickup unit 1004 and performs an exposure compensation process on the image data on the basis of the information in the image processing settings. In addition, the exposure compensation processing unit 1005 outputs the image data subjected to the exposure compensation process to the storage unit 1002.

Note that according to the present embodiment, the exposure compensation process includes image processing, such as a back light compensation process and a dark area correction process. As used herein, the term "back light compensation process" refers to a process to make the entire image data including a dark area brighter. In addition, the term "dark area correction process" refers to a process to detect a dark area contained in the image data and make the detected dark area brighter while maintaining the brightness of a bright area.

In addition, according to the present embodiment, the exposure compensation process has an exposure setting function of setting up the exposure condition of the image pickup unit 1004. Examples of the exposure condition include the value of the aperture of the imaging optical system included in the image pickup unit 1004 and an exposure time (a charge accumulating time) of the imaging device included in the image pickup unit 1004.

Hereinafter, "wide dynamic range" is abbreviated as "WDR", and a "wide dynamic range image synthesizing process" is abbreviated as a "WDR process" as appropriate.

The WDR image synthesizing processing unit 1006 detects the best parts of an image in terms of brightness from the images captured under different exposure conditions and output by the image pickup unit 1004 and, thereafter, synthesizes the parts into image data for a single photo having a wide dynamic range. Subsequently, the WDR image synthesizing processing unit 1006 outputs the generated synthesized image data to the storage unit 1002.

A compression coding unit 1007 performs a compression coding process on the image data output from each of the image pickup unit 1004, the exposure compensation processing unit 1005, and the WDR image synthesizing processing unit 1006 on the basis of the compression coding settings in the form of, for example, JPEG, H.264, or H.265. Subsequently, the compression coding unit 1007 outputs, to the storage unit 1002, the image data subjected to the compression coding process.

Note that according to the present embodiment, upon receiving a streaming distribution request from the client device 2000, the security camera 1000 performs streaming distribution of the image data output from the compression coding unit 1007 to the outside via the communication unit 1003.

Figure 3:
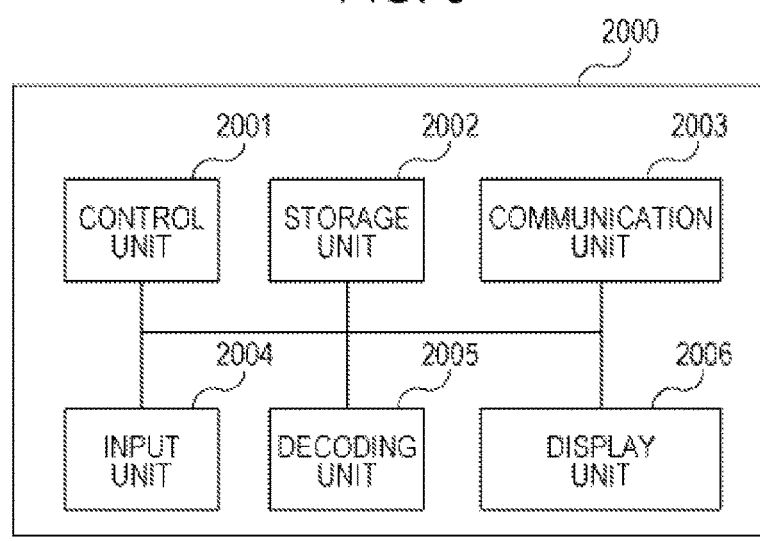
FIG. 3 illustrates an example of the hardware configuration of a client device according to the first embodiment of the present invention.

FIG. 3 illustrates an example of the hardware configuration of the client device 2000 according to the present embodiment. According to the present embodiment, the client device 2000 is configured as a computer apparatus connected to the IP network 1500.

As illustrated in FIG. 3, a control unit 2001 performs overall control of the client device 2000. The control unit 2001 is formed from, for example, a CPU and executes a program stored in a storage unit 2002 (described in more detail below). Alternatively, the control unit 2001 may control the client device 2000 using hardware. The storage unit 2002 is used as a storage area of a program executed by the control unit 2001, a work area used during program execution, and a storage area of data.

Upon receiving an instruction from the control unit 2001, a communication unit 2003 transmits, for example, a command to the security camera 1000. In addition, the communication unit 2003 receives, for example, a response to the command and the image data transmitted from the security camera 1000 through streaming distribution.

An input unit 2004 is formed from, for example, a button, a four-way arrow key, a touch panel, or a mouse. The input unit 2004 receives, as an input, an instruction from a user. For example, the input unit 2004 can receive, from the user, an input indicating an instruction to send a variety of commands to the security camera 1000.

In addition, if the input unit 2004 receives, from the user, a command transmission instruction for the security camera 1000, the input unit 2004 sends, to the control unit 2001, a message indicating that the input unit 2004 received the input. The control unit 2001 generates a command for the security camera 1000 in accordance with the instruction input to the input unit 2004. Subsequently, the control unit 2001 instructs the communication unit 2003 to transmit the generated command to the security camera 1000.

Furthermore, the input unit 2004 can receive, from a user, an input serving as a response to a message generated by a program that is stored in the storage unit 2002 and that is executed by the control unit 2001.

A decoding unit 2005 decodes and decompresses the image data output from the communication unit 2003. Thereafter, the decoding unit 2005 causes a display unit 2006 to display an image corresponding to the decoded and decompressed image data. Note that the display unit 2006 can display, for example, an inquiry message for the user. The inquiry message is generated by the program that is stored in the storage unit 2002 and is executed by the control unit 2001.

While the internal configuration of each of the security camera 1000 and the client device 2000 has been described with reference to FIGS. 2 and 3, the internal configurations are not limited thereto, since the processing blocks illustrated in FIGS. 2 and 3 describe only an exemplary embodiment of the image pickup apparatus and the external apparatus. A variety of modifications and variations are possible without deviating from the broad scope of the invention. For example, the internal configuration may further include an audio input unit and an audio output unit.

Figure 4:
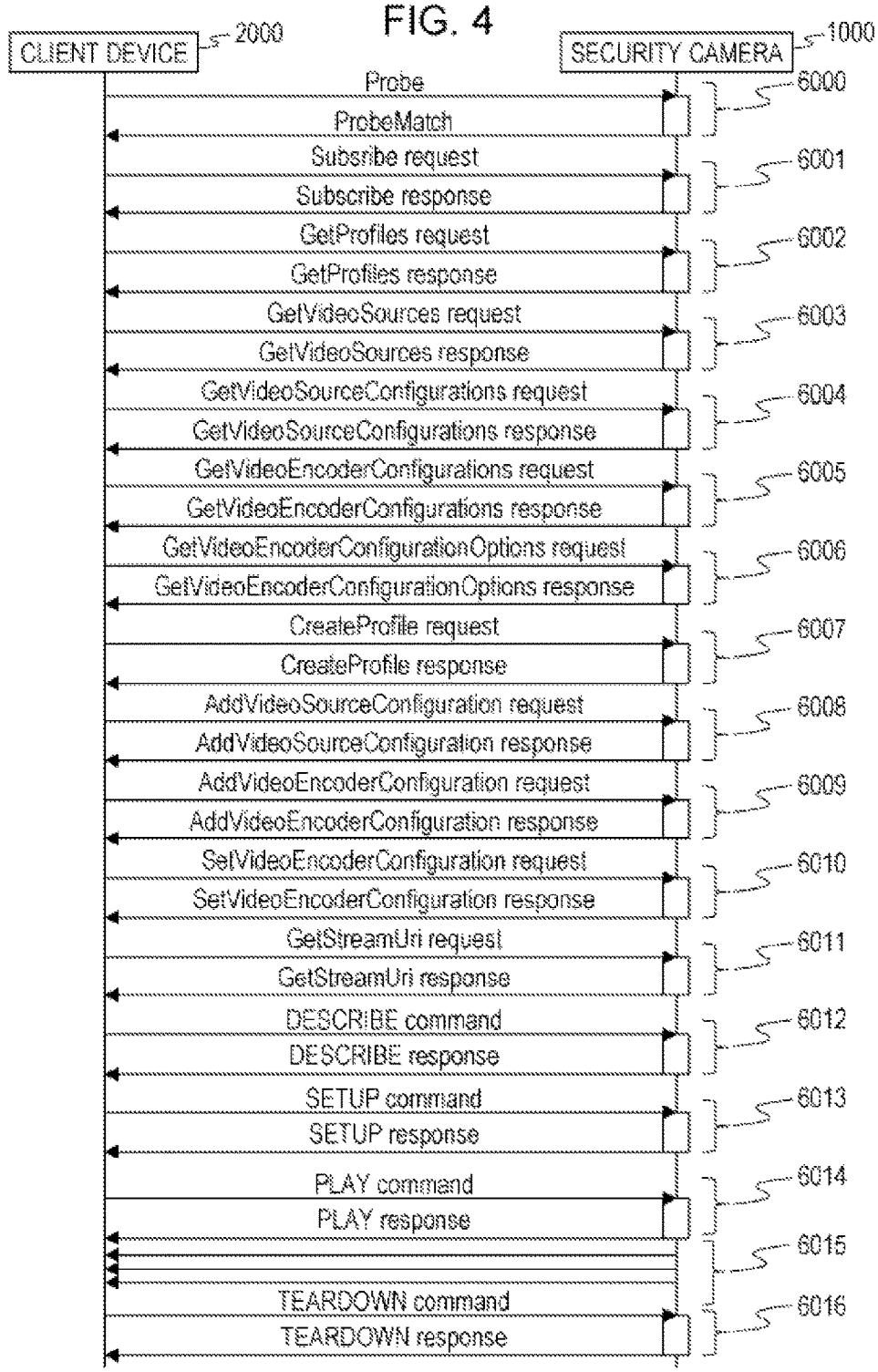
FIG. 4 is a sequence diagram illustrating a command sequence between the security camera and the client device according to the first embodiment of the present invention.

FIG. 4 is a sequence diagram illustrating a typical command sequence between the security camera 1000 and the client device 2000 from start of parameter setting of an image that is to be streaming-distributed to start of streaming distribution of the image.

As used herein, the term "transaction" refers to a pair consisting of a command transmitted from the client device 2000 to the security camera 1000 and a corresponding response returned from the security camera 1000 to the client device 2000.

A transaction 6000 illustrated in FIG. 4 is used to connect network devices with each other. The client device 2000 transmits a Probe command for network device connection to the IP network 1500 by unicast or multicast. The security camera 1000 connected to the network sends back a Probe-Match response indicating that the security camera 1000 is ready for receiving a command to the client device 2000.

By using Subscribe transaction 6001, the client device 2000 can instruct the security camera 1000 to perform event distribution.

GetProfiles transaction 6002 is used to obtain MediaProfile saying as a distribution profile. As used herein, the term "MediaProfile" refers to a parameter set for storing a variety of setting items of the security camera 1000 by associating them with one another.

The variety of setting items include ProfileToken which is an ID of the MediaProfile, VideoSourceConfiguration (described in more detail below), VideoEncoderConfiguration (described in more detail below), and an audio encoder. The MediaProfile retains links to a variety of setting items.

The client device 2000 transmits a GetProfiles command to the security camera 1000. Upon receiving the GetProfiles command, the security camera 1000 sends a list of MediaProfile to the client device 2000.

In this manner, the client device 2000 obtains the list of MediaProfile currently available to the security camera 1000 together with a distribution profile ID used for identifying MediaProfile. Note that the client device 2000 identifies a distributable distribution profile setting in the security camera 1000 using the distribution profile ID.

By using transaction 6003 of a GetVideoSources command, the client device 2000 obtains a list of VideoSource held by the security camera 1000.

As used herein, the term "VideoSource" refers to a set of parameters indicating the performance of an image pickup unit 1004 included in the security camera 1000. In addition, VideoSource includes VideoSourceToken, which is an ID of VideoSource, and Resolution indicating the resolution of image data outputtable by the image pickup unit 1004.

The client device 2000 transmits the GetVideoSources command to the security camera 1000. Upon receiving the GetVideoSources command, the security camera 1000 sends back a response to the command to the client device 2000.

GetVideoSourceConfigurations transaction 6004 is used for obtaining the list of VideoSourceConfiguration held by the security camera 1000.

As used herein, the term "VideoSourceConfiguration" refers to a set of parameters that map the VideoSource included in the security camera 1000 to the MediaProfile. In addition, the VideoSourceConfiguration includes Bounds that indicates which part of the image data output from the VideoSource is cut out to make a distribution image.

Hereinafter, VideoSourceConfiguration is also simply referred to as "VSC".

The client device 2000 transmits a GetVideoSourceConfigurations command to the security camera 1000. Upon receiving the GetVideoSourceConfigurations command, the security camera 1000 sends back a list containing the ID of VSC held by the security camera 1000 to the client device 2000.

By using GetVideoEncoderConfigurations transaction 6005, the client device 2000 obtains the list of VideoEncoderConfiguration held by the security camera 1000.

The client device 2000 transmits a GetVideoEncoderConfigurations command to the security camera 1000. Upon receiving the GetVideoEncoderConfigurations command, the security camera 1000 sends back a response to the command.

As used herein, the term "VideoEncoderConfiguration" refers to a set of parameters that map the encoder settings for compression coding of the image data to the MediaProfile. Hereinafter, VideoEncoderConfiguration is simply referred to as "VEC" as appropriate.

VEC contains VECToken, which is the ID of the VEC, Encoding which specifies a compression encoding technique (e.g., JPEG or H.264), Resolution which specifies the resolution of an output image, and Quality which specifies the quality of compression encoding. VEC further contains FramerateLimit which specifies the maximum frame rate of image data output from the security camera 1000 and BitrateLimit which specifies the maximum bit rate of the image data.

For example, the security camera 1000 compression-encodes the VideoSource and the image data output on the basis of the information in VSC in accordance with the parameters set in the VEC and, thereafter, distributes the encoded VideoSource and the image data to the client device 2000 via the communication unit 1003.

By using GetVideoEncoderConfigurationOptions transaction 6006, the client device 2000 can obtain the options and the range of a setup value acceptable by the security camera 1000 for the VEC identified by the ID.

The client device 2000 transmits a GetVideoEncoderConfigurationOptions command to the security camera 1000. Upon receiving the GetVideoEncoderConfigurationOptions command, the security camera 1000 sends back a response to the command. By using the transaction, the client device 2000 obtains, from the security camera 1000, a list containing the ID for compression encoding stored in the storage unit 1002.

CreateProfile transaction 6007 is used to request creation of a distribution profile. The client device 2000 transmits a CreateProfile command to the security camera 1000. Upon receiving the CreateProfile command, the security camera 1000 sends back a response to the command.

By using the transaction, the client device 2000 can newly create a distribution profile in the security camera 1000 and obtain the ID of the created distribution profile. The security camera 1000 stores the newly created distribution profile therein.

After processing the transaction command, the security camera 1000 transmits a MediaProfile update notification event to the client device 2000. In this manner, the security camera 1000 notifies the client device 2000 of the update of the MediaProfile.

Add VideoSourceConfiguration transaction 6008 is used to request for adding a new VSC. The client device 2000 transmits an AddVideoSourceConfiguration command to the security camera 1000. Upon receiving the AddVideoSourceConfiguration command the security camera 1000 sends back a response to the command to the client device 2000.

By using the transaction, the client device 2000 specifies the distribution profile ID obtained in the CreateProfile transaction 6007 and the ID of VSC obtained in the GetVideoSourceConfigurations transaction 6004. In this manner, the client device 2000 can associate a desired VSC corresponding to the specified ID of VSC with the MediaProfile corresponding to the specified distribution profile ID.

In contrast, the security camera 1000 stores the MediaProfile corresponding to the distribution profile ID specified by the client device 2000 in association with a desired VSC corresponding to the ID of VSC specified by the client device 2000.

AddVideoEncoderConfiguration transaction 6009 is used to request for adding a new VEC. The client device 2000 transmits an Add VideoEncoderConfiguration command to the security camera 1000. The security camera 1000 sends back a response to the command to the client device 2000.

By using the transaction, the client device 2000 specifies the distribution profile ID obtained in the CreateProfile transaction 6007 and the ID of VEC obtained in the GetVideoEncoderConfigurations transaction 6005. In this manner, the client device 2000 can associate the VEC corresponding to the specified ID of VEC with the MediaProfile corresponding to the specified distribution profile ID.

In contrast, the security camera 1000 stores the MediaProfile corresponding to the distribution profile ID specified by the client device 2000 in association with a desired VSC corresponding to the BD of VSC specified by the client device 2000.

After the AddVideoSourceConfiguration transaction 6008 and the AddVideoEncoderConfiguration transaction 6009 are processed, the security camera 1000 sends a MediaProfile update notification event to the client device 2000. In this manner, the security camera 1000 notifies the client device 2000 of the update of the MediaProfile.

SetVideoEncoderConfiguration transaction 6010 is used to set up a variety of parameters of VEC. The client device 2000 sends a SetVideoEncoderConfiguration command to the security camera 1000.

Upon receiving the SetVideoEncoderConfiguration command, the security camera 1000 sends back a response to the command. By using the transaction, the client device 2000 sets up the information in VEC obtained in the GetVideoEncoderConfigurations transaction 6005 on the basis of the options obtained in the GetVideoEncoderConfigurationOptions transaction 6006. For example, the compression coding technique and a cut-out size are changed. The security camera 1000 stores the setup information regarding the compression coding settings.

After the SetVideoEncoderConfiguration transaction 6010 is processed, the security camera 1000 sends a VEC update notification event to the client device 2000. In this manner, the security camera 1000 notifies the client device 2000 of the update of VEC.

GetStreamUri transaction 6011 is used to request for obtaining a distribution address. By using the transaction, the client device 2000 specifies the distribution profile ID obtained in the CreateProfile transaction 6007 and obtains an address (a URI) used for obtaining, for example, an image to be streaming-distributed on the basis of the specified distribution profile settings.

The security camera 1000 sends back, to the client device 2000, the VSC associated with the distribution profile M specified by the client device 2000 and the address used for streaming-distributing an image corresponding to the information in the VEC.

DESCRIBE transaction 6012 is used to request for obtaining distribution information. The client device 2000 sends a DESCRIBE command to the security camera 1000. Upon receiving the DESCRIBE command, the security camera 1000 sends back a response to the command to the client device 2000.

In the DESCRIBE transaction 6012, the client device 2000 executes the DESCRIBE command using the URI obtained in the GetStreamUri transaction 6011. In this manner, the client device 2000 requests and obtains the content streaming-distributed by the security camera 1000.

SETUP transaction 6013 is used to request for distribution settings. The client device 2000 sends a SETUP command to the security camera 1000. Upon receiving the SETUP command, the security camera 1000 sends back a response to the command to the client device 2000.

In the SETUP transaction 6013, the client device 2000 causes the security camera 1000 to prepare for streaming on the basis of detailed data regarding the distribution information obtained in the DESCRIBE transaction 6012. By executing the command, the same transfer method of the stream including a session number can be employed by the client device 2000 and the security camera 1000.

PLAY transaction 6014 is used to start streaming distribution. The client device 2000 sends a PLAY command to the security camera 1000. Upon receiving the PLAY command, the security camera 1000 sends back a response to the command to the client device 2000.

When sending the PLAY command to the security camera 1000, the client device 2000 uses the session number obtained in the SETUP transaction 6013. Thus, the client device 2000 can request the security camera 1000 to start streaming.

A stream 6015 is distributed from the security camera 1000 to the client device 2000. The stream requested to start in the PLAY transaction 6014 is distributed using the transfer method employed by the security camera 1000 and the client device 2000 in the SETUP transaction 6013.

TEARDOWN transaction 6016 is used to stop the distribution. The client device 2000 sends a TEARDOWN command to the security camera 1000. Upon receiving TEARDOWN command, the security camera 1000 sends back a response to the command to the client device 2000.

In the TEARDOWN transaction 6016, the client device 2000 specifies the session number obtained in the SETUP transaction 6013 and executes a TEARDOWN command. In this manner, the client device 2000 can request the security camera 1000 to stop streaming.

Figure 5:
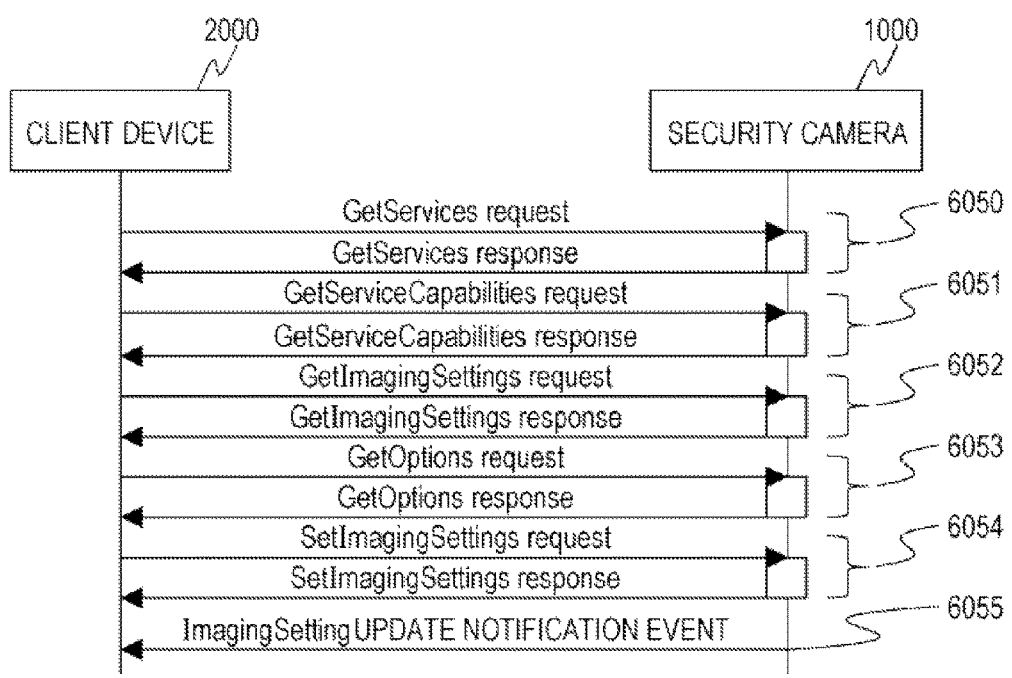
FIG. 5 is a sequence diagram illustrating a command sequence between the security camera and the client device according to the first embodiment of the present invention.

FIG. 5 is a sequence diagram illustrating a typical command sequence for changing ImagingSettings, which corresponds to image processing setting between the security camera 1000 and the client device 2000.

Transaction 6050 is based on a GetServices command. By using the GetServices command, the client device 2000 obtains the types of Web service supported by the security camera 1000 and the address URIs of the Web services.

The GetServices transaction 6050 is illustrated in FIG. 5. By using the GetServices transaction, the client device 2000 can obtain the types of Web services supported by the security camera 1000 and the address URIs of the Web services.

The client device 2000 transmits the GetServices command to the security camera 1000. Upon receiving the GetServices command, the security camera 1000 sends back a response to the command to the client device 2000.

By using GetServiceCapabilities transaction 6051, the client device 2000 can obtain a list of the Web service capabilities obtained in the GetServices transaction 6050.

The client device 2000 transmits a GetServiceCapabilities command to the security camera 1000. Upon receiving the GetServices command, the security camera 1000 sends back a response to the command to the client device 2000.

By using GetImagingSettings transaction 6052, the client device 2000 can obtain a list of GetImagingSettings held by the security camera 1000.

The client device 2000 sends a GetImagingSettings command to the security camera 1000. Upon receiving the GetServices command the security camera 1000 sends back a response to the command to the client device 2000.

GetOptions transaction 6053 is based on a GetOptions command. By using GetOptions transaction 6053, the client device 2000 can obtain the options of parameters of ImagingSettings acceptable by the security camera 1000.

The client device 2000 sends a GetOptions command to the security camera 1000. Upon receiving the GetOptions command, the security camera 1000 sends back a response to the command to the client device 2000.

By using SetImagingSettings transaction 6054, the client device 2000 sends new ImagingSettings to the security camera 1000. Thus, the client device 2000 can change the information in ImagingSettings.

An ImagingSettings update notification event 6055 is illustrated in FIG. 5. After a command in the SetImagingSettings transaction 6054 is processed, the security camera 1000 sends the ImagingSetting update notification event to the client device 2000. Thus, the client device 2000 is notified of the update of ImagingSettings.

FIGS. 6A to 6E illustrate an example of the definitions of the types of ImagingSettings according to the present embodiment. Note that according to the present embodiment, the types of ImagingSettings are defined by the XML Schema Definition language (hereinafter also simply referred to as "XSD") that is used in the ONVIF standard.

In addition, according to the present embodiment, each of the response in the GetImagingSettings transaction 6052 and the command in the SetImagingSettings transaction 6054 illustrated in FIG. 5 includes data of the ImagingSettings type illustrated in FIGS. 6A to 6E.

FIG. 6A illustrates information regarding the ImagingSettings type. In FIG. 6A, a sequence specifier indicates that elements appear in the same order as defined by the sequence specifier.

In FIG. 6A, a BacklightCompensation parameter (hereinafter also simply referred to as "BLC") is used to turn on or off a back light compensation function. The minOccurs specifier of XSD indicates that BLC can be left out.

A Brightness parameter is used to specify the brightness of an image to be captured by the image pickup unit 1004. Brightness can be left out by using a minOccurs specifier of XSD. A ColorSaturation parameter is used to specify the saturation of an image to be captured by the image pickup unit 1004. The minOccurs specifier of XSD indicates that ColorSaturation can be left out.

A Contrast parameter is used to specify the density of color of an image to be captured by the image pickup unit 1004. The minOccurs specifier of XSD indicates that Contrast can be left out. An Exposure parameter is used to change exposure on an image to be captured by the image pickup unit 1004. The minOccurs specifier of XSD indicates that Exposure can be left out.

A Focus parameter is used to change the focus setting of the image pickup unit 1004. The minOccurs specifier of XSD indicates that Focus can be left out. An IrCutFilter parameter is used to change the setting regarding an infrared cut filter (IRCF), which is insertable into the optical path of the imaging optical system included in the image pickup unit 1004.

Note that IRCF blocks infrared light. The minOccurs specifier of XSD indicates that IrCutFilter can be left out.

A Sharpness parameter is used to change the sharpness setting of an image to be captured by the image pickup unit 1004. The minOccurs specifier of XSD indicates that Sharpness can be left out.

A WideDynamicRange parameter is used to change the setting of a WDR process performed by the WDR image synthesizing processing unit 1006. Either "ON" or "OFF" can be set as a value of the WideDynamicRange parameter. The minOccurs specifier of XSD indicates that WideDynamicRange can be left out.

Note that WideDynamicRange having a value of "ON" indicates that the WDR process of the security camera 1000 is to be turned on. In contrast, WideDynamicRange having a value of "OFF" indicates that the WDR process of the security camera 1000 is to be turned off. That is, according to the present embodiment, a SetImagingSettings command corresponds to a synthesizing command for controlling the operation performed by the WDR image synthesizing processing unit 1006.

A WhiteBalance parameter is used to change the white balance of an image to be captured by the image pickup unit 1004. The minOccurs specifier of XSD indicates that WhiteBalance can be left out. In addition, Extension includes an extended parameter illustrated in FIG. 6B. The minOccurs specifier of XSD indicates that Extension can be left out.

FIGS. 6B to 6E illustrate parameters that are added to ImagingSettings illustrated in FIG. 6A. Like the parameters illustrated in FIG. 6A, these parameters are part of the image processing settings.

An ImageStabilization parameter illustrated in FIG. 6B is used to set up a vibration-proof function for an image captured by the image pickup unit 1004. In FIG. 6B, the sequence specifier indicates that elements appear in FIG. 6B in the same order as specified by the definition.

An IrCutFilterAutoAdjustment parameter illustrated in FIG. 6C is used to set up information applied when IRCF is inserted and removed (e.g., the luminance of a subject and a delay time). In FIG. 6C, the sequence specifier indicates that elements appear in FIG. 6C in the same order as specified by the definition.

Note that the minOccurs specifier of XSD indicates that each of ImageStabilization and IrCutFilterAutoAdjustment can be left out.

A DarkCompensation parameter illustrated in FIG. 6D is used to set up a dark area compensation function of the exposure compensation processing unit 1005 that detects a dark area and a bright area of an image captured by the image pickup unit 1004 and compensates for only the dark area to be brighter. In FIG. 6D, the sequence specifier indicates that elements appear in FIG. 6D in the same order as specified by the definition.

Hereinafter, DarkCompensation is simply referred to as "DC" as appropriate. The minOccurs specifier of XSD indicates that DarkCompensation can be left out.

The values "ON", "OFF", or "AUTO" can be set in DC. DC having a value of "ON" indicates that the dark area compensation function of the security camera 1000 is turned on. DC having a value of "OFF" indicates that the dark area compensation function of the security camera 1000 is turned off. In addition, DC having a value of "AUTO" indicates that the security camera 1000 automatically determines whether the dark area compensation function thereof is turned on or off.

Thus, the SetImagingSettings command according to the present embodiment corresponds to an exposure setting command for controlling the operation performed by the exposure compensation processing unit 1005.

Note that for the security camera 1000 according to the present embodiment, either the value "ON" or "OFF" can be set in each of WDR and BLC (i.e., the options of each of WDR and BLC are "ON" and "OFF"). In contrast, the values "ON", "OFF", or "AUTO" can be set in DC (i.e., the options of DC are "ON", "OFF", and "AUTO").

Accordingly, in the GetOptions transaction 6053, the above-described options for WDR, BLC, and DC are sent back to the client device 2000 as the settable parameters.

In addition, in the SetImagingSettings transaction 6054, WDR having a value of "ON" can additionally have Level parameter indicating an effect level. Herein, description of Level is not provided. Similarly, in the SetImagingSettings transaction 6054, DC having a value of "ON" can additionally have Level parameter indicating an effect level. Herein, description of Level is not provided.

Figure 7:
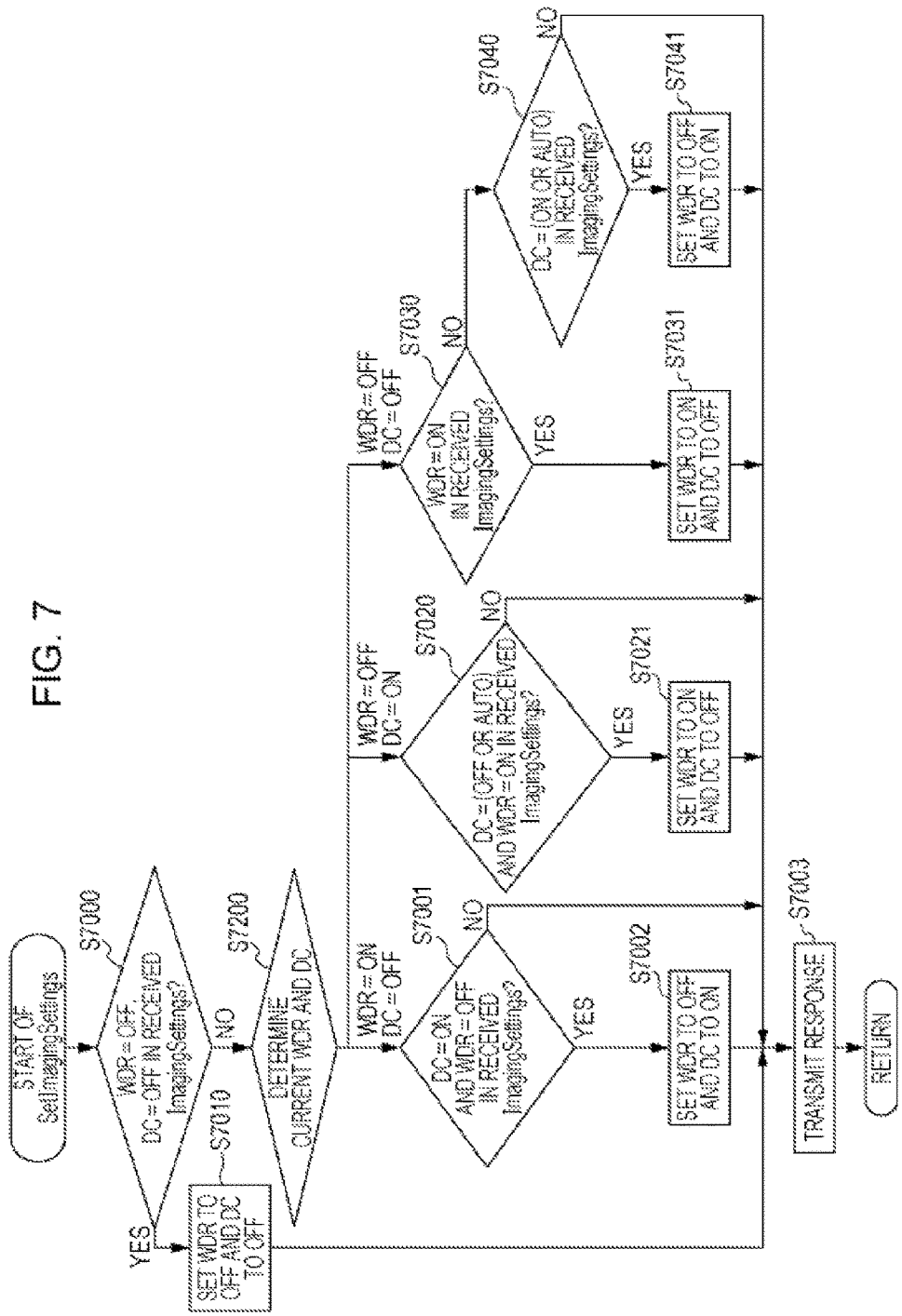
FIG. 7 illustrates a SetImagingSettings reception process according to the first embodiment of the present invention.

FIG. 7 illustrates a SetImagingSettings reception process performed when the security camera 1000 receives a SetImagingSettings command from the client device 2000.

Note that the SetImagingSettings reception process is performed by the control unit 1001. Hereinafter, only the parameters of WDR and DC of SetImagingSettings are described, and description of the other parameters are not provided.

In step S7000, the control unit 1001 determines whether the value of each of WDR and DC contained in the SetImagingSettings command received by the communication unit 1003 is OFF.

If the control unit 1001 determines that the value of each of WDR and DC contained in the SetImagingSettings command is OFF, the processing proceeds to step S7010. However, if the control unit 1001 determines that at least one of the values of WDR and DC contained in the SetImagingSettings command is not OFF, the processing proceeds to step S7200.

In step S7010, the control unit 1001 turns off the WDR image synthesizing processing unit 1006. In addition, the control unit 1001 turns off the exposure compensation processing unit 1005. Thus, the operations of the WDR image synthesizing processing unit 1006 and the exposure compensation processing unit 1005 stop. Furthermore, the control unit 1001 sets the value of WDR to OFF and sets the value of DC to OFF in the current image processing settings stored in the storage unit 1002.

Note that the current image processing settings stored in the storage unit 1002 are, for example, the image processing settings that has been stored in the storage unit 1002 before the image processing settings are updated by the SetImagingSettings command determined in step S7000.

In step S7200, the control unit 1001 determines whether each of the values of WDR and DC in the current image processing settings stored in the storage unit 1002 is ON or OFF. If the control unit 1001 determines that the value of WDR in the current image processing settings stored in the storage unit 1002 is ON and the value of DC is OFF, the processing proceeds to step S7001.

If the control unit 1001 determines that the value of WDR in the current image processing settings stored in the storage unit 1002 is OFF and the value of DC is ON, the processing proceeds to step 37020. However, if the control unit 1001 determines that the value of WDR in the current image processing settings stored in the storage unit 1002 is OFF and the value of DC is OFF, the processing proceeds to step S7030.

In step S7001, the control unit 1001 determines whether the value of DC contained in the SetImagingSettings command determined in step S7000 is ON and determines whether the value of WDR contained in the command is OFF.

If the control unit 1001 determines that the value of DC contained in the command is ON and the value of WDR contained in the command is OFF, the processing proceeds to step S7002. However, if the control unit 1001 determines that the value of DC contained in the command is not ON or the value of WDR contained in the command is not OFF, the processing proceeds to step S7003.

For example, if each of the values of DC and WDR contained in the command determined in step S7000 is ON, the processing in step S7002 is not performed, and the processing proceeds to step S7003, where the control 1001 sends a response to the client device 2000.

In step S7002, the control unit 1001 turns off the WDR image synthesizing processing unit 1006 and turns on the exposure compensation processing unit 1005 (i.e., the operation performed by the exposure compensation processing unit 1005 is started). In addition, the control unit 1001 sets the value of WDR in the current image processing settings stored in the storage unit 1002 to OFF and sets the value of DC to ON.

Note that when the control unit 1001 turns on the exposure compensation processing unit 1005, the operation performed by the exposure compensation processing unit 1005 starts.

In step S7003, the control unit 1001 instructs the communication unit 1003 to send, to the client device 2000, a response to the SetImagingSettings command determined in step S7000. At that time, the response is a normal response. Note that the determination result in step S7200 or the values of WDR and DC set up in, for example, step S7002 may be sent together with or separately from the response indicating a normal response.

In step S7020, the control unit 1001 determines whether the value of WDR contained in the command determined in step S7000 is ON. In addition, the control unit 1001 determines whether the value of DC contained in the command is OFF or AUTO.

If the control unit 1001 determines that the value of WDR contained in the command determined in step S7000 is ON and the value of DC contained in the command is OFF or AUTO, the processing proceeds to step S7021.

In step S7021, the control unit 1001 turns on the WDR image synthesizing processing unit 1006 and turns off the exposure compensation processing unit 1005. In addition, the control unit 1001 sets the value of WDR in the current image processing settings stored in the storage unit 1002 to ON and sets the value of DC to OFF.

Note that when the control unit 1001 turns on the WDR image synthesizing processing unit 1006, the operation performed by the WDR image synthesizing processing unit 1006 starts.

In addition, the control unit 1001 may instruct the communication unit 1003 to send, to the client device 2000, an event indicating that the value of DC in the security camera 1000 is set to OFF.

In step S7030, the control unit 1001 determines whether the value of WDR contained in the command determined in step S7000 is ON. If the control unit 1001 determines that the value of WDR contained in the command determined in step S7000 is ON, the processing proceeds to step S7031.

In step S7031, the control unit 1001 turns on the WDR image synthesizing processing unit 1006 and turns off the exposure compensation processing unit 1005. In addition, the control unit 1001 sets the value of WDR in the current image processing settings stored in the storage unit 1002 to ON and sets the value of DC to OFF.

In step S7040, the control unit 1001 determines whether the value of DC contained in the command determined in step S7000 is ON or AUTO.

If the control unit 1001 determines that the value of DC contained in the command determined in step S7000 is ON or AUTO, the processing proceeds to step S7040. However, if the control unit 1001 determines that the value of DC contained in the command determined in step S7000 is neither ON nor AUTO, the processing proceeds to step S7003.

In step S7041, the control unit 1001 turns off the WDR image synthesizing processing unit 1006 and turns on the exposure compensation processing unit 1005. In addition, the control unit 1001 sets the value of WDR in the current image processing settings stored in the storage unit 1002 to OFF and sets the value of DC to ON.

Note that the control unit 1001 may instruct the communication unit 1003 to send, to the client device 2000, a message indicating that the value of DC in the security camera 1000 is set to OFF.

Figure 8:
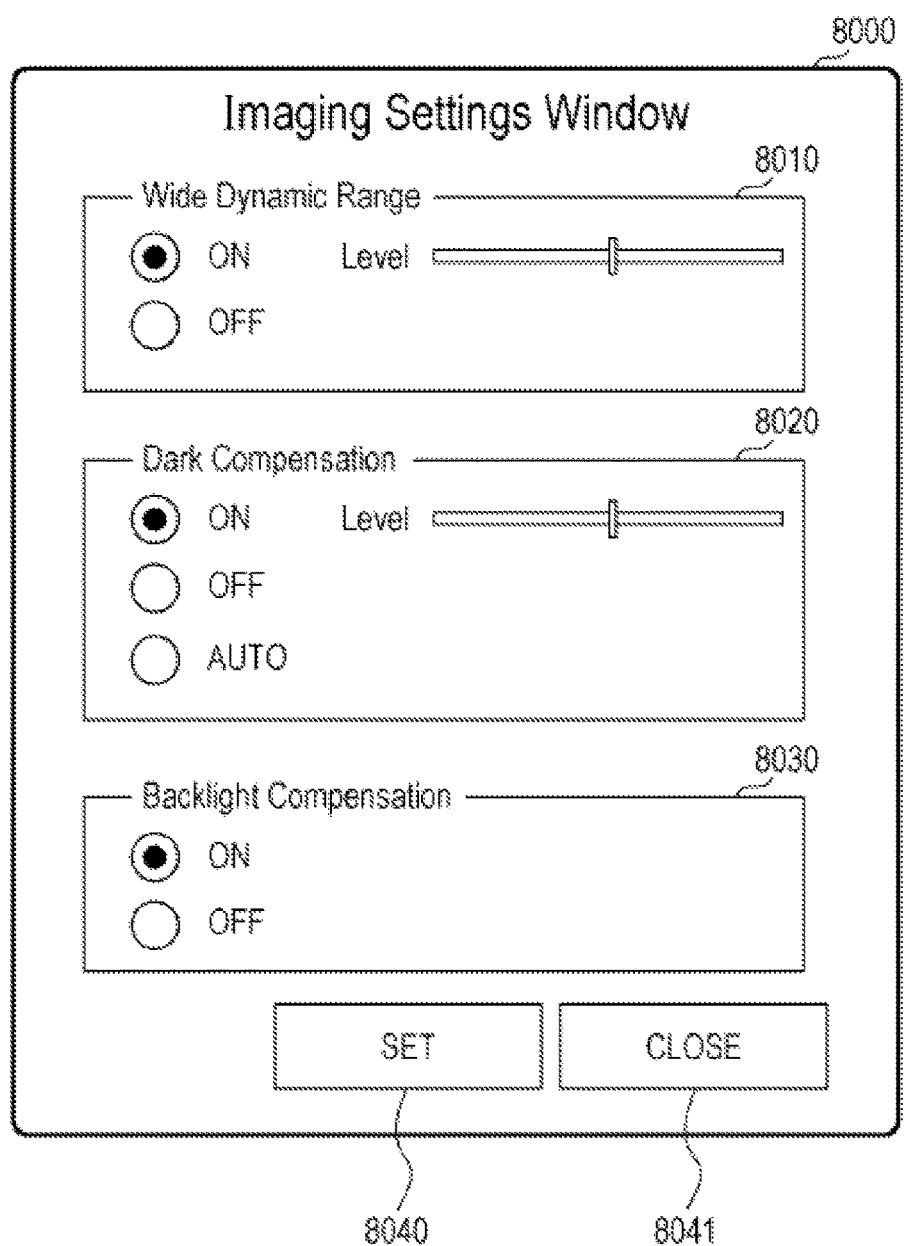
FIG. 8 illustrates an example of an ImagingSettings setting screen according to the first embodiment of the present invention.

FIG. 8 illustrates an example of an ImagingSettings setting screen used for setting up ImagingSettings of the security camera 1000. The screen is displayed on the display unit 2006 by the control unit 2001.

As illustrated in FIG. 8, an ImagingSettings setting screen 8000 includes a WideDynamicRange setting parameter input area 8010 and a DarkCompensation setting parameter input area 8020. In addition, the ImagingSettings setting screen 8000 includes a BacklightCompensation setting parameter input area 8030, a set button 8040, and a close button 8041.

If the set button 8040 is pressed by a user, the client device 2000 sends, to the security camera 1000, the SetImagingSettings command in accordance with the information set in the ImagingSettings setting screen 8000. In addition, after sending the information, the client device 2000 stops displaying the ImagingSettings setting screen 8000.

In contrast, if the close button 8041 is pressed by the user, the client device 2000 stops displaying the ImagingSettings setting screen 8000 without sending the SetImagingSettings command to the security camera 1000.

Figure 9:
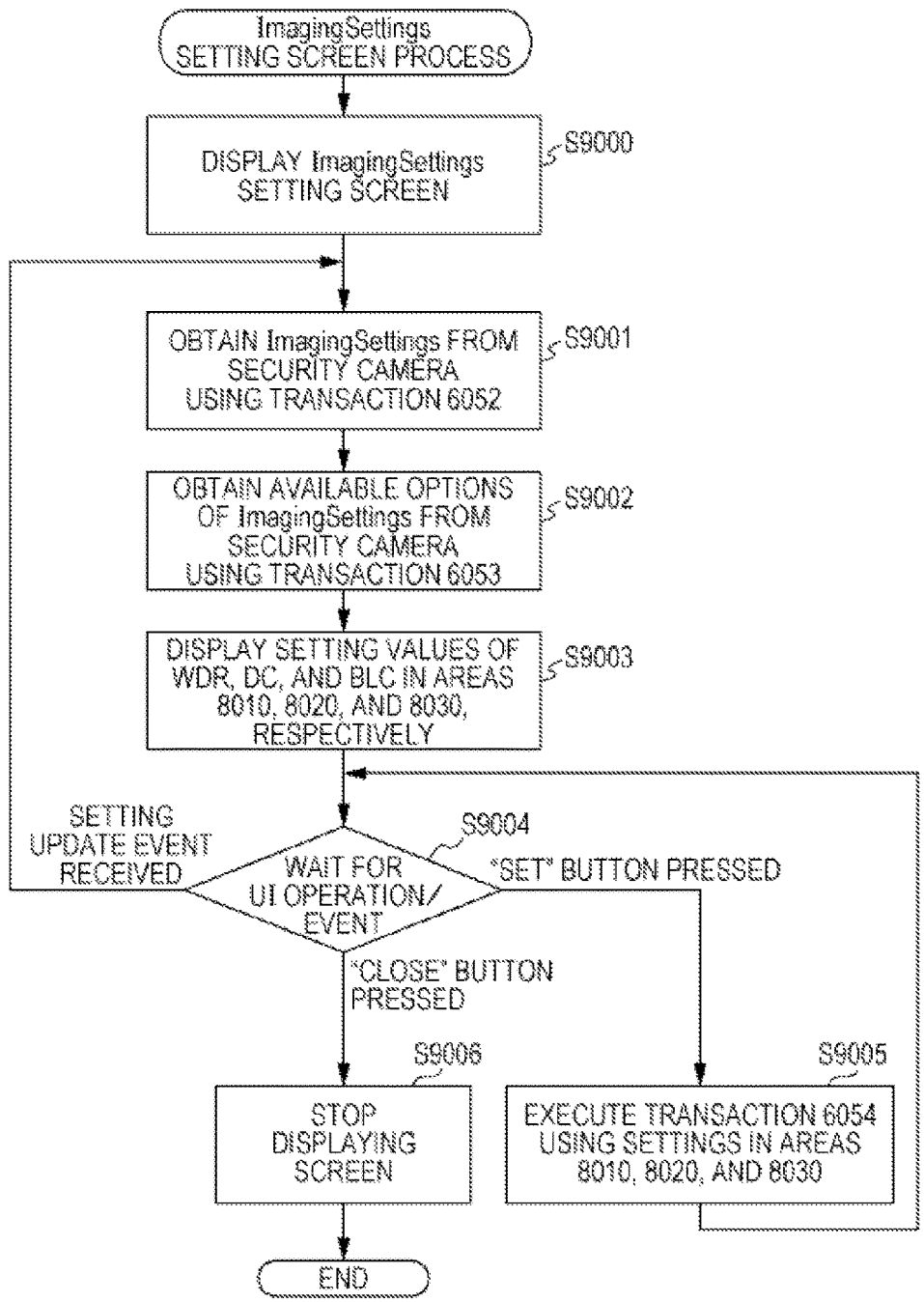
FIG. 9 is a flowchart illustrating a SetImagingSettings setting screen display process according to the first embodiment of the present invention.

FIG. 9 is a flowchart illustrating a SetImagingSettings setting screen display process performed by the client device 2000 according to the present embodiment. This process is performed by the client device 2000 when a user of the client device 2000 changes the image processing setting for an image that is streaming-distributed from the security camera 1000.

Note that this process is performed by the control unit 2001. In addition, as a result of the process, the screen illustrated in FIG. 8 is displayed on the display unit 2006 of the client device 2000.

While only the values of WDR, DC, and BLC of ImagingSettings are displayed in the screen of FIG. 8 so as to be settable, the parameters are not limited thereto. For example, the values of the other parameters illustrated in FIGS. 6A to 6E (or all the parameters) may be displayed in the screen of FIG. 8 so as to be settable.

In step S9000 illustrated in FIG. 9, the control unit 2001 instructs the display unit 2006 to display the ImagingSettings setting screen illustrated in FIG. 8.

In step S9001, the control unit 2001 executes the GetImagingSettings transaction 6052 and obtains the list of the ImagingSettings from the security camera 1000.

At that time, in general, the number of the ImagingSettings contained in the list is the same as the number of image pickup units included in a security camera. According to the present embodiment, the security camera 1000 includes only one image pickup unit 1004. Accordingly, the number of the ImagingSettings contained in the list obtained in step S9001 is one. However, the number of the ImagingSettings contained in the list is not limited thereto.

For example, if a security camera includes a plurality of image pickup units, a plurality of the ImagingSettings are contained in the list obtained in step S9001. In such a case, to switch screens of the plurality of ImagingSettings, a plurality of tabs may be displayed in the screen of FIG. 8.

Alternatively, the screen of FIG. 8 may be displayed for each of the plurality of the ImagingSettings. For example, if two ImagingSettings are contained in the list obtained in step S9001, two screens of FIG. 8, each for one of the two ImagingSettings, may be displayed.

In step S9002, the control unit 2001 executes the GetOptions transaction 6053 and obtains, from the security camera 1000, the options acceptable by the security camera 1000 for each of the parameters of the ImagingSettings.

In step S9003, the control unit 2001 instructs the display unit 2006 to display the screen of FIG. 8. At that time, in accordance with the set value of each of WDR, DC, and BLC contained in the ImagingSettings obtained in step S9001, the control unit 2001 causes a radio button corresponding to the set value in the screen of FIG. 8 to be being checked.

In addition, among the radio buttons in the screen of FIG. 8, the control unit 2001 causes the display unit 2006 to display a radio button corresponding to the option that is not acceptable by the security camera 1000 on the basis of the information regarding the options obtained in step S9002 such that the user cannot select the radio button.

In step S9004, the control unit 2001 enters a standby mode until any one of the buttons in the screen of FIG. 8 is pressed or an ImagingSetting update notification event 6055 is received from the security camera 1000.

If the control unit 2001 determines that the set button 8040 is pressed, the processing proceeds to step S9005. However, if the control unit 2001 determines that the close button 8041 is pressed, the processing proceeds to step S9006. If the control unit 2001 receives the ImagingSetting update notification event 6055 via the communication unit 2003, the processing performed by the control unit 2001 returns to step S9001.

In step S9005, the control unit 2001 generates a SetImagingSettings command including a parameter corresponding to the radio button selected in the input area of each of the WideDynamicRange setting parameter input area 8010, the DarkCompensation setting parameter input area 8020, and the BacklightCompensation setting parameter input area 8030. Thereafter, the control unit 2001 instructs the communication unit 2003 to send the generated SetImagingSettings command to the security camera 1000.

In step S9006, the control unit 20 instructs the display unit 2006 to stop displaying the screen of FIG. 8.

As described above, according to the present embodiment, even when the security camera 1000 cannot concurrently operate the exposure compensation processing unit 1005 and the WDR image synthesizing processing unit 1006, the security camera 1000 can accept a command of the SetImagingSettings transaction 6054 for concurrently operating the exposure compensation processing unit 1005 and the WDR image synthesizing processing unit 1006.

In this manner, the user can change the settings of the ImagingSettings without degradation in ease of use of the security camera 1000. In addition, this process can prevent the user from misunderstanding that the security camera 1000 does not support the exposure compensation process and the wide dynamic range process.

Second Embodiment

A second embodiment of the present invention is described below with reference to FIG. 10. Note that the same numbering is used for components that are the same as those of the above-described embodiment, and descriptions of the components are not repeated as appropriate.

In the first embodiment described above, the security camera 1000 that does not send an error response even when the security camera 1000 receives a SetImagingSettings command that turns on both WDR and DC.

The security camera 1000 prioritizes the values of WDR and DC in the image processing settings stored in the storage unit 1002 over those contained in the received SetImagingSettings command and controls the exposure compensation processing unit 1005 and the WDR image synthesizing processing unit 1006.

Like the security camera 1000 according to the first embodiment, a security camera 1000 according to the second embodiment does not send an error response even when the security camera 1000 receives a SetImagingSettings command that turns on both WDR and DC.

Unlike the security camera 1000 according to the first embodiment, the security camera 1000 according to the second embodiment prioritizes the values of WDR and DC contained in the received SetImagingSettings command over those in the image processing settings stored in the storage unit 1002 and controls the exposure compensation processing unit 1005 and the WDR image synthesizing processing unit 1006. Such a second embodiment is described below.

Figure 10:
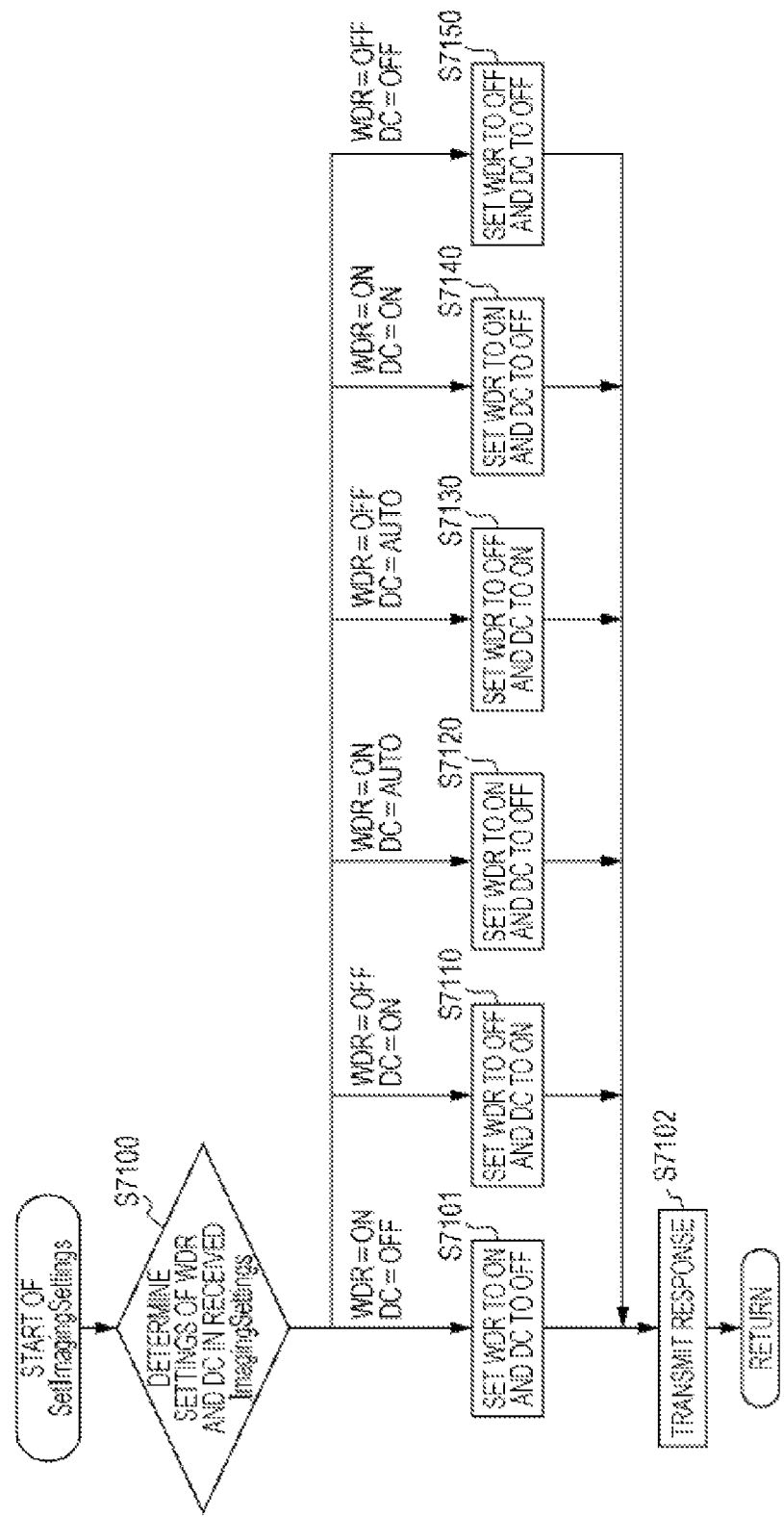
FIG. 10 is a flowchart of a SetImagingSettings command reception process according to a second embodiment of the present invention.

FIG. 10 is a flowchart illustrating a process performed when the security camera 1000 receives a SetImagingSettings command from the client device 2000 according to the present embodiment. Note that this process is performed by the control unit 1001. Hereinafter, only parameters of WDR and DC in the ImagingSettings are described, and description of the other parameters are not provided.

In step S7100, the control unit 1001 determines whether each of the values of WDR and DC contained in the SetImagingSettings command received by the communication unit 1003 is ON, OFF, or AUTO. If the control unit 1001 determines that the value of WDR contained in the command is ON and the value of DC contained in the command is OFF, the processing proceeds to step S7101.

If the control unit 1001 determines that the value of WDR contained in the command is OFF and the value of DC contained in the command is ON, the processing proceeds to step S7110. However, if the control unit 1001 determines that the value of WDR contained in the command is ON and the value of DC contained in the command is AUTO, the processing proceeds to step S7120.

If the control unit 1001 determines that the value of WDR contained in the command is OFF and the value of DC contained in the command is AUTO, the processing proceeds to step S7130. However, if the control unit 1001 determines that the value of WDR contained in the command is ON and the value of DC contained in the command is ON, the processing proceeds to step S7140.

If the control unit 1001 determines that the value of WDR contained in the command is OFF and the value of DC contained in the command is OFF, the processing proceeds to step S7150. Since step S7101 is the same as the above-described step S7021, description of step S7101 is not repeated. Since step S7110 is the same as the above-described step S7002, description of step S7110 is not repeated. Since step S7120 is the same as the above-described step S7031, description of step S7120 is not repeated. Since step S7130 is the same as the above-described step 97002, description of step S7130 is not repeated. Since step S7140 is the same as the above-described step S7031, description of step S7140 is not repeated. Since step S7150 is the same as the above-described step S7010, description of step S7150 is not repeated. Since step S7102 is the same as the above-described step S7003, description of step S7102 is not repeated.

As described above, according to the present embodiment, even when the security camera 1000 cannot concurrently operate the exposure compensation processing unit 1005 and the WDR image synthesizing processing unit 1006, the security camera 1000 can accept a command of the SetImagingSettings transaction 6054 for concurrently operating the exposure compensation processing unit 1005 and the WDR image synthesizing processing unit 1006.

In this manner, the user can change the settings of the ImagingSettings without degradation in ease of use of the security camera 1000. In addition, this process can prevent the user from misunderstanding that the security camera 1000 does not support the exposure compensation process and the wide dynamic range process.

In addition, the security camera 1000 can prioritize the values of WDR and DC contained in the received command over those in the image processing settings stored in the storage unit 1002 and control the exposure compensation processing unit 1005 and the WDR image synthesizing processing unit 1006.

In this manner, the latest user's intention can be reflected to control of the exposure compensation processing unit 1005 and the WDR image synthesizing processing unit 1006.

While the above-described embodiment has been described with reference to the operations exclusively (selectively) performed by the WDR image synthesizing processing unit 1006 and the exposure compensation processing unit 1005, the operations are not limited thereto. For example, the control unit 1001 may provide a back light compensation process.

As used herein, the term "back light compensation process" refers to a process to automatically adjust the exposure of the security camera 1000. In such a case, the control unit 1001 may be configured such that the back light compensation process and the WDR image synthesizing processing unit 1006 are exclusively (selectively) operated.

In addition, in this case, in the flowcharts illustrated in FIGS. 7 and 10, the control unit 1001 may use the value of a parameter of BacklightCompensation contained in the SetImagingSettings command received by the communication unit 1003 instead of the value of DC contained in the SetImagingSettings command.

Furthermore, in this case, in the flowcharts illustrated in FIGS. 7 and 10, the control unit 1001 may turn on the back light compensation process instead of turning on the exposure compensation processing unit 1005 and, in addition, turn off the back light compensation process instead of turning off the exposure compensation processing unit 1005.

In addition, for example, if the control unit 1001 can provide a shutter speed control process that controls the shutter speed, the control unit 1001 may be configured so as to exclusively (selectively) operate the shutter speed control process and the WDR image synthesizing processing unit 1006.

Furthermore, in such a case, in the flowcharts illustrated in FIGS. 7 and 10, the control unit 1001 uses the value of Exposure contained in the SetImagingSettings command received by the communication unit 1003 instead of the value of DC contained in the SetImagingSettings command.

Still furthermore, in this case, in the flowcharts illustrated in FIGS. 7 and 10, the control unit 1001 may turn on the shutter speed control process instead of turning on the exposure compensation processing unit 1005 and, in addition, turn off the shutter speed control process instead of turning off the exposure compensation processing unit 1005.

In addition to DC and Exposure of ImagingSettings, the same can apply to the other parameters of ImagingSettings.

While the above embodiment has been described with reference to the configuration of the control unit 1001 in which the setting value of WDR is prioritized over the setting value of DC and is employed in the process in step S7030 and the subsequent processes of FIG. 7 by determining the setting value of WDR before determining the setting value of DC, the configuration is not limited thereto.

For example, the control unit 1001 may be configured such that the setting value of DC is prioritized over the setting value of WDR and is employed. That is, in FIG. 7, step S7030 and step S7040 may be exchanged, and step S7031 and step S7041 may be exchanged. In this manner, the control unit 1001 may be configured so that the setting value of DC is determined before the setting value of WDR is determined.

According to the first embodiment described above, if a command for turning on the exposure compensation processing unit 1005 and the WDR image synthesizing processing unit 1006 at the same time is received, the current image processing settings stored in the security camera 1000 are prioritized. Thus, one of the exposure compensation processing unit 1005 and the WDR image synthesizing processing unit 1006 is turned ON. In contrast, according to the second embodiment described above, if the command is received, the values of WDR and DC specified in the command are prioritized. Thus, one of the exposure compensation processing unit 1005 and the WDR image synthesizing processing unit 1006 is turned ON.

However, the configuration is not limited thereto. For example, let the SetImagingSettings command received by the communication unit 1003 include a Level parameter indicating the intensity of WDR and a Level parameter indicating the intensity of DC.

Then, the control unit 1001 may be configured so as to determine which one of the value of the Level parameter of WDR and the value of the Level parameter of DC is greater. In addition, the control unit 1001 may be configured so as to turn on one of the exposure compensation processing unit 1005 and the WDR image synthesizing processing unit 1006 having a greater Level parameter.

In addition, let the control unit 1001 have a frame rate determination process to determine whether the frame rate of the image data distributed from the communication unit 1003 is lower than or equal to a predetermined value.

Then, the control unit 1001 may be configured so as to turn on the exposure compensation processing unit 1005 if it is determined that the frame rate is lower than or equal to the predetermined value and turn on the WDR image synthesizing processing unit 1006 if the frame rate is not lower than or not equal to the predetermined value.

In addition, for example, the security camera 1000 may additionally include an image analyzing unit that analyzes the image data output from the image pickup unit 1004. Furthermore, the control unit 1001 may be configured so as to turn on one of the exposure compensation processing unit 1005 and the WDR image synthesizing processing unit 1006 that is determined to improve the quality of the image more.

More specifically, let the control unit 1001 be capable of providing a moving object detecting process. As used herein, the term "moving object detecting process" refers to a process to detect a moving object included in an image data generated by the image pickup unit 1004.

Then, the control unit 1001 may be configured so as to turn on the exposure compensation processing unit 1005 if a moving object is detected in the moving object detecting process and turn on the WDR image synthesizing processing unit 1006 if any moving object is not detected in the moving object detecting process.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-223524, filed Oct. 28, 2013, which is hereby incorporated by reference herein in its entirety.

The invention claimed is:

1. An image pickup apparatus capable of communicating with an external apparatus via a network, the image pickup apparatus comprising:
   a hardware processor; and
   a memory for storing instructions to be executed by the hardware processor, wherein, when the instructions stored in the memory are executed by the hardware processor, the image pickup apparatus functions as:
   an image pickup unit,
   a receiving unit configured to receive, from the external apparatus via the network, a command including synthesizing information and exposure information, wherein the synthesizing information is for controlling a first operation to synthesize a plurality of images captured by the image pickup unit under different exposure conditions and generate synthesized image data, and wherein the exposure information is for controlling a second operation to set an exposure condition and to obtain an image generated under the exposure condition,
   a control unit configured to selectively perform one of the first operation and the second operation if the command is received by the receiving unit, and
   a transmitting unit configured to transmit, to the external apparatus via the network, a non-error response in response to the received command,
   wherein, if the synthesizing information includes a command to cause the image pickup apparatus to automatically control the first operation, the control unit selects the first operation to perform, and if the exposure information includes a command to cause the image pickup apparatus to automatically control the second operation, the control unit selects the second operation to perform.

2. The image pickup apparatus according to claim 1, further comprising a first determination unit configured to determine which one of the first operation and the second operation is of higher priority.

3. The image pickup apparatus according to claim 2, wherein the first determination unit determines that one of the first operation and the second operation that is currently operating is of higher priority.

4. The image pickup apparatus according to claim 2, wherein the control unit selects one of the first operation and second the second operation based on a subject captured by the image pickup unit.

5. The image pickup apparatus according to claim 4, further comprising a detecting unit configured to detect a moving object contained in image data generated by the image pickup unit,
   wherein, if a moving object is detected by the detecting unit, the control unit selects the second operation to perform.

6. The image pickup apparatus according to claim 2, further comprising a distribution unit configured to distribute one of the image data synthesized by the first operation and the image data obtained by the second operation to the external apparatus via the network,
   wherein the control unit selects the second operation to perform if a frame rate of the image data distributed by the distribution unit is lower than or equal to a predetermined value.

7. A method for controlling an image pickup apparatus capable of communicating with an external apparatus via a network, wherein the image pickup apparatus includes an image pickup unit, the method comprising:
   receiving, from the external apparatus via the network, a command including synthesizing information and exposure information, wherein the synthesizing information is for controlling a first operation to synthesize a plurality of images captured by the image pickup unit under different exposure conditions and to generate synthesized image data, and wherein the exposure information is for controlling a second operation to set an exposure condition and to obtain an image generated under the exposure condition;

selectively performing one of the first operation and the second operation if the command is received; and transmitting, to the external apparatus via the network, a non-error response in response to the received command, wherein, if the synthesizing information includes a command to cause the image pickup apparatus to automatically control the first operation, selectively performing includes selecting the first operation to perform, and if the exposure information includes a command to cause the image pickup apparatus to automatically control the second operation, selectively performing includes selecting the second operation to perform.

8. The method according to claim 7, further comprising determining, as a first determination, which one of the first operation and the second operation is of higher priority.

9. The method according to claim 8, wherein the first determination determines that one of the first operation and the second operation that is currently operating is of higher priority.

10. The method according to claim 8, wherein selectively performing includes selection one of the first operation and second the second operation based on a subject captured by the image pickup unit.

11. The method according to claim 10, further comprising detecting a moving object contained in image data generated by the image pickup unit, wherein, if detecting includes detecting a moving object, selectively performing includes selecting the second operation to perform.

12. The method according to claim 11, further comprising distributing one of the image data synthesized by the first operation and the image data obtained by the second operation to the external apparatus via the network, wherein selectively performing includes selecting the second operation to perform if a distributed frame rate of the image data is lower than or equal to a predetermined value.

13. A non-transitory computer-readable storage medium storing a program to cause a computer to perform a method for controlling an image pickup apparatus capable of communicating with an external apparatus via a network, wherein the image pickup apparatus includes an image pickup unit, the method comprising:

receiving, from the external apparatus via the network, a command including synthesizing information and exposure information, wherein the synthesizing information is for controlling a first operation to synthesize a plurality of images captured by the image pickup unit under different exposure conditions and to generate synthesized image data, and wherein the exposure information is for controlling a second operation to set an exposure condition and to obtain an image generated under the exposure condition;

selectively performing one of the first operation and the second operation if the command is received; and transmitting, to the external apparatus via the network, a non-error response in response to the received command, wherein, if the synthesizing information includes a command to cause the image pickup apparatus to automatically control the first operation, selectively performing includes selecting the first operation to perform, and if the exposure information includes a command to cause the image pickup apparatus to automatically control the second operation, selectively performing includes selecting the second operation to perform.

* * * * *